United States Patent

Twardowski

[11] Patent Number: 4,806,215
[45] Date of Patent: Feb. 21, 1989

[54] COMBINED PROCESS FOR PRODUCTION OF CHLORINE DIOXIDE AND SODIUM HYDROXIDE

[75] Inventor: Zbigniew Twardowski, Mississauga, Canada

[73] Assignee: Tenneco Canada Inc., Islington, Canada

[21] Appl. No.: 224,756

[22] Filed: Jul. 27, 1988

[51] Int. Cl.$^4$ ............................................. C15B 1/14
[52] U.S. Cl. ............................. 204/98; 204/101; 204/103; 423/478
[58] Field of Search .................... 204/101, 98, 103; 423/478

[56] References Cited

U.S. PATENT DOCUMENTS 4,129,484  12/1978  Larsson ............................. 204/101

Primary Examiner—R. L. Andrews
Attorney, Agent, or Firm—Sim & McBurney

[57] ABSTRACT

A hydrochloric acid-based chlorine dioxide generating process is integrated with an electrolytic process for sodium hydroxide production. Generator liquor in the form of a sodium chloride-enriched solution from the chlorine dioxide generator is passed to the central compartment of a three-compartment cell. Hydrogen ions formed in the anode compartment of the three-compartment cell migrate through a cation-exchange membrane to the central compartment to form hydrochloric acid with the sodium chloride solution while sodium ions migrate through a further cation-exchange membrane to form sodium hydroxide with hydroxyl ions produced in the cathode compartment of the three-compartment cell. The acidified generator liquor containing the hydrochloric acid formed in the central compartment is forwarded to the chlorine dioxide generator to provide half the acid requirement therefor.

3 Claims, 2 Drawing Sheets

COMBINED PROCESS FOR PRODUCTION OF CHLORINE DIOXIDE AND SODIUM HYDROXIDE

FIELD OF INVENTION

The present invention relates to an integrated process which produces chlorine dioxide and sodium hydroxide.

BACKGROUND TO THE INVENTION

Chlorine dioxide and sodium hydroxide are widely used in the bleach plant of pulp mills for brightening and purifying pulp. Chlorine dioxide is produced on-site at the mill by reduction of sodium chlorate in an acid aqueous reaction medium, in accordance with the equation:

$$ClO_3^- + Cl^- + 2H^+ \rightarrow ClO_2 + \tfrac{1}{2}Cl_2 + H_2O$$

Sodium hydroxide usually also is formed on-site at the mill by electrolysis of aqueous sodium chloride solution in a divided cell, in accordance with the equation:

$$NaCl + H_2O \rightarrow NaOH + \tfrac{1}{2}Cl_2 + \tfrac{1}{2}H_2$$

Sodium hydroxide is formed at the cathode and chlorine at the anode. The chlorine co-produced often has little value to the pulp mill.

One class of chlorine dioxide-generating process is one involving reaction of sodium chlorate with hydrochloric acid, in accordance with the equation:

$$NaClO_3 + 2HCl \rightarrow ClO_2 + \tfrac{1}{2}Cl_2 + NaCl + H_2O$$

One example of such process is the so-called "R5" process, as described in Canadian Pat. No. 956,784 of the assignee hereof, the disclosure of which is incorporated herein by reference, wherein the reaction is effected in a boiling reaction medium having a total acid normality of about 0.05 to about 0.3 normal to which a subatmospheric pressure is applied. The resulting chlorine dioxide and chloride are removed from the reaction zone in admixture with steam. The process may be effected with precipitation of by-product sodium chloride or with removal of an aqueous effluent containing by-product sodium chloride.

Another example of such a chlorine dioxide-generating process is the electrolytic process described in U.S. patent application Ser. No. 156,965 filed Feb. 18, 1988, assigned to the assignee hereof and the disclosure of which is incorporated herein by reference. As described therein, externally-fed chlorate ions are reduced with hydrogen ions and chloride ions in the cathode compartment of an electrolytic cell having a three-dimensional high surface-area cathode separated from an anode compartment by a cation-exchange membrane. An electric current applied to the cell reduces co-produced chlorine in the cathode compartment to chloride ions while electrolytically-formed hydrogen ions, generally providing about one-half the acid requirement, are transferred across the cation-exchange membrane from the anode compartment to the cathode compartment. The process produces an aqueous sodium chloride by-product stream from the cathode compartment.

SUMMARY OF INVENTION

In accordance with the present invention, there is provided a novel integrated process whereby a hydrochloric acid-based chlorine dioxide generating process is integrated with an electrolytic sodium hydroxide-forming process to achieve a more efficient use of chemicals and to avoid the formation of unwanted by-products.

The sodium hydroxide is formed in an electrolytic cell which has three compartments, namely an anode compartment, a central compartment and a cathode compartment. The compartments are separated one from another by cation-exchange membranes.

Chlorine dioxide is formed by reacting sodium chlorate with hydrochloric acid in a reaction zone and an aqueous effluent containing sodium chloride is passed from the reaction zone to the central compartment of the electrolytic cell.

Hydrogen ions are formed electrolytically in the anode compartment of the electrolytic cell from an electrolyte and are transferred from the anode compartment to the central compartment across one of the cation-exchange membranes to form hydrochloric acid therein. Hydroxyl ions are formed electrolytically from an electrolyte in the cathode compartment and sodium ions are transferred from the central compartment to the cathode compartment across the other of the cation exchange membranes to form sodium hydroxide therein.

Hydrochloric acid-containing effluent is forwarded from the central compartment of the electrolytic cell to the reaction zone to provide hydrochloric acid therein. Chlorine dioxide is removed from the reaction zone. Sodium hydroxide is recovered from the cathode compartment of the electrolytic cell.

The reactions involved may be represented by the following equations:

Chlorine dioxide generator:
$$NaClO_3 + 2HCl \rightarrow ClO_2 + \tfrac{1}{2}Cl_2 + H_2O + NaCl$$

Electrolytic cell:
anode: $\tfrac{1}{2}H_2O \rightarrow H^+ + e^- + \tfrac{1}{4}O_2$
cathode: $H_2O + e^- \rightarrow \tfrac{1}{2}H_2 + OH^-$
central: $NaCl + H^+ \rightarrow Na^+ + HCl$
overall: $NaCl + 3/2 H_2O \rightarrow NaOH + HCl + \tfrac{1}{2}H_2 + \tfrac{1}{4}O_2$ From these equations, it will be apparent that the by-product sodium chloride from the chlorine dioxide-generating process is processed in the electrolytic cell to produce one-half the acid requirement of the chlorine dioxide generator while, in the electrolytic cell, sodium hydroxide is produced without the coproduction of chlorine.

Chlorine from the chlorine dioxide generating process may be collected with the chlorine dioxide, as in the case of a non-precipitating R5 process, or may be electrolytically reduced to provide the remainder of the hydrochloric acid requirement, as in the case of the process of the aforementioned copending U.S. patent application Ser. No. 156,965.

DESCRIPTION OF PREFERRED EMBODIMENTS

Figure 1:
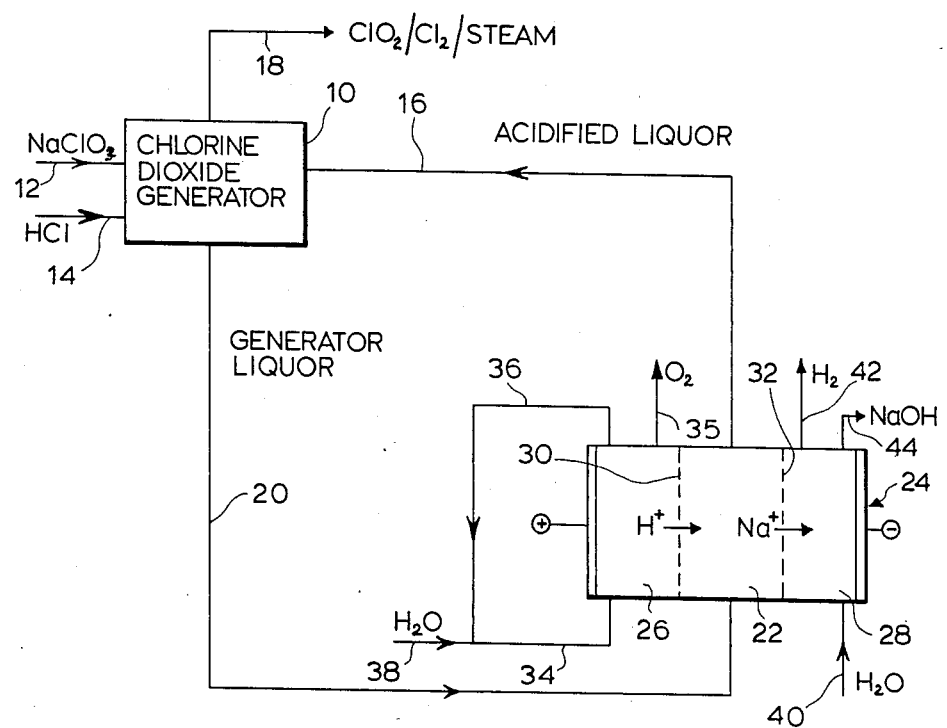
FIG. 1 is a schematic flow sheet of a chlorine dioxide- and sodium hydroxide-producing process in accordance with one embodiment of the invention.

Referring first to FIG. 1, there is shown therein a chlorine dioxide generator 10 to which aqueous sodium chlorate solution is fed by line 12, hydrochloric acid is fed by line 14 and recycled acidified generator liquor is fed by line 16. The sodium chlorate is fed to the chlorine dioxide generator 10 in the form of an aqueous solution thereof having a concentration of about 3 to about 7 molar.

In the chlorine dioxide generator 10, the reactants form an aqueous acid reaction medium having a sodium chlorate concentration of about 3 to about 7 molar, preferably about 5 to about 6.5 molar, and an acidity of about 0.01 to about 0.3 normal, preferably about 0.05 to about 0.1 normal. The reaction medium is maintained at its boiling point of about 50° to about 85° C., preferably about 60° to about 70° C., while a subatmospheric pressure is applied thereto to maintain the reaction medium at its boiling point.

Chlorine dioxide and chlorine are formed from the reactants in the chlorine dioxide generator 10 and are removed from the chlorine dioxide generator in gaseous admixture with steam by line 18. The gaseous products stream may be processed to recover the chlorine dioxide therefrom as an aqueous solution thereof.

Sodium chloride is formed as a by-product of the chlorine dioxide-generating process. Generator liquor in the form of an aqueous by-product stream enriched with sodium chloride is removed from the chlorine dioxide generator and is forwarded by line 20 to the central compartment 22 of a three-compartment electrolytic cell 24, which also has an anode compartment 26 and a cathode compartment 28. The anode compartment 26 and the central compartment 22 are separated by a cation-exchange membrane 30 while the cathode compartment 28 and the central compartment 22 also are separated by a cation-exchange membrane 32.

The cation-exchange membranes 30 and 32 may be formed of any convenient material which enables cations to selectively pass therethrough in preference to anions. Preferably, the cation exchange members 30 and 32 are formed of perfluorocarbon polymers having pendant cation-exchange functional groups, such as those sold under the trademark "NAFION".

Removed from the central compartment 22 by line 16 and forwarded to the chlorine dioxide generator 10 is acidified generator liquor in the form of a hydrochloric acid-enriched and sodium chloride-depleted solution, formed as described below.

After an initial charge of an oxy-acid, usually sulfuric acid, water is fed by line 34 to the anode compartment 26, wherein the water is electrolyzed to oxygen, which is vented by line 35, and hydrogen ions, which migrate across the cation-exchange membrane 30 to the central compartment 22. The anolyte sulfuric acid solution is recycled by line 36 and make-up water is added by line 38.

In the central compartment 22, the migrated hydrogen ions form hydrochloric acid with the chloride ions in the generator liquor fed by line 20 while the sodium ions migrate from the central compartment 22 to the cathode compartment 28.

Water is fed by line 40 to the cathode compartment 28 wherein it is electrolyzed to form hydrogen, which is vented by line 42 and hydroxyl ions. The hydroxyl ions combine with the sodium ions transferred across the membrane to form sodium hydroxide, which is removed from the cathode compartment 28 by line 44.

The process shown in FIG. 1, therefore, produces chlorine dioxide, chlorine and sodium hydroxide from feeds of sodium chlorate and hydrochloric acid, in accordance with the overall equation:

$$NaClO_3 + HCl \rightarrow ClO_2 + \tfrac{1}{2}Cl_2 + NaOH$$

Half the hydrochloric acid required by the chlorine dioxide generator 10 is fed from exterior to the system while the remainder is generated internally in the cell 24, with the by-product sodium chloride from the chlorine dioxide generator being converted to sodium hydroxide.

Figure 2:
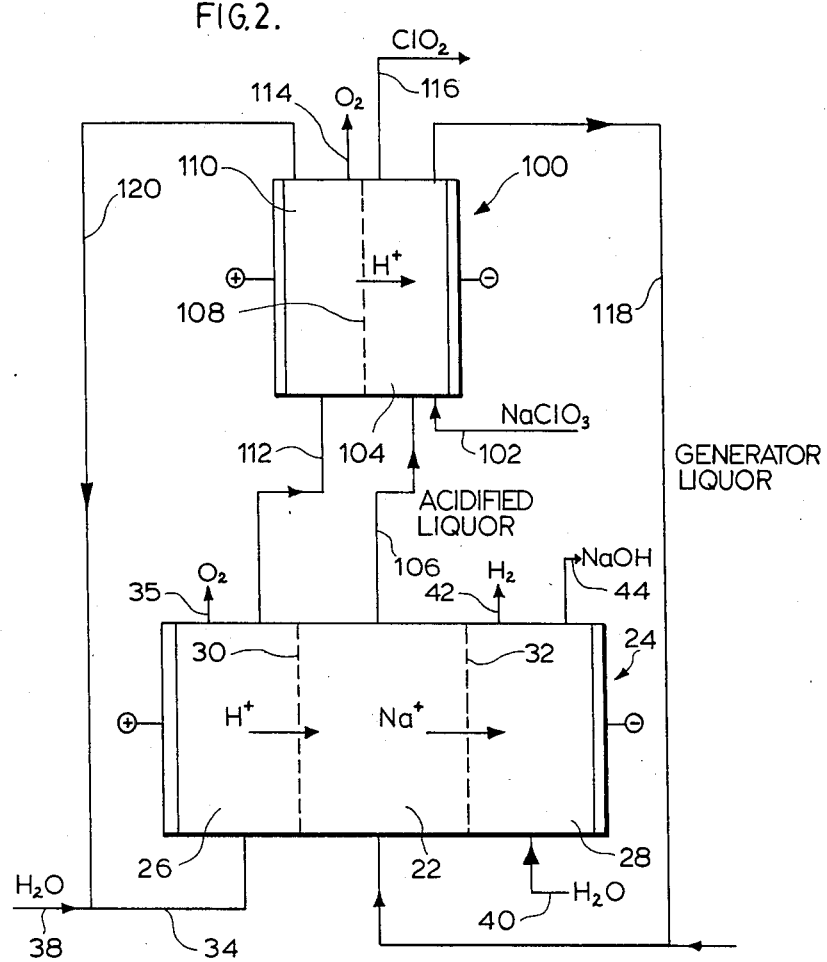
FIG. 2 is a schematic flow sheet of a chlorine dioxide- and sodium hydroxide-producing process in accordance with another embodiment of the invention.

Turning now to FIG. 2, there is illustrated therein a process similar to that described with respect to FIG. 1, with sodium chlorate and water forming substantially pure chlorine dioxide and sodium hydroxide. In this case, the chlorine dioxide is formed in an electrolytic cell 100. The electrolytic production of chlorine dioxide is described in the aforementioned copending United States patent application Ser. No. 156,965. The three-compartment electrolytic cell 24 is retained.

Aqueous sodium chlorate solution is fed by line 102 to the cathode compartment 104 of the cell 100, which contains a three-dimensional electrode. Acidified generator liquor containing hydrochloric acid also is fed to the cathode compartment 104 by line 106.

The aqueous sodium chlorate solution fed by line 102 has a concentration sufficient to establish, at its flow rate, a relatively high concentration of sodium chlorate in the cathode compartment 104, generally greater than about 5 molar, preferably about 5 to about 6.5 molar. Usually, the sodium chlorate feed solution has a concentration in the range of about 3 to about 7 molar.

The cell 100 has a cation-exchange membrane 108 separating the cathode compartment 104 from an anode compartment 110. The cation exchange membrane 108 may be formed of any of the materials described above for the membranes 30 and 32.

After an initial charge of an oxy-acid, usually sulfuric acid, water is fed by line 112 to the anode compartment 110 and hydrogen ions produced by electrolysis of the anolyte migrate across the cation-exchange membrane 108 to the cathode compartment 104.

The hydrogen ion migration across the cation-exchange membrane 108 and the feed of hydrochloric acid by line 106 establish a total acid normality in the cathode compartment 18 of at least about 0.01 normal, preferably at least about 0.05 normal.

The oxygen co-produced in the electrolysis step in the anode compartment is vented by line 114 from the anode compartment 110.

In the cathode compartment 104, the sodium chlorate fed by line 102 reacts chemically with the hydrogen ions and chloride ions in the acidified generator liquor fed by line 106, the electrolytically-produced hydrogen ions transferred across the cation-exchange membrane 108 and the chloride ions electrolytically produced in the cathode compartment 104 as described below, to form chlorine dioxide and chlorine in accordance with the equation:

$$NaClO_3 + 2H^+ + 2Cl^- \rightarrow ClO_2 + \tfrac{1}{2}Cl_2 + NaCl + H_2O$$

One-half of the hydrogen ion requirement is provided by the acid fed by line 106 with the remainder of the hydrogen ion requirement is provided by the hydrogen ions transferred from the anode compartment 110.

The co-produced chlorine is reduced under the electrochemical conditions which exist in the cathode compartment 104 to chloride ions selectively with respect to the chlorine dioxide present therein. The remaining substantially pure chlorine dioxide is vented from the cathode compartment 104 by line 116.

The chloride ions so electrochemically produced provide half the chloride ions for the chemical reduction of the chlorate in the cathode compartment 104, with the remainder of the chloride ions being provided by the hydrochloric acid in the acidified generator liquor in line 106, or from some other convenient external source of chloride ions, such as sodium chloride.

Depending on the electrolytic conditions in the cathode compartment 104, the chloride ions may be produced directly from the co-produced chlorine by electrochemical reduction, in accordance with the equation:

$$\tfrac{1}{2}Cl_2 + e \rightarrow Cl^-$$

or indirectly by reduction chemically with chlorite ion electrolytically produced from chlorine dioxide, in accordance with the equations:

$$ClO_2 + e \rightarrow ClO_2^-$$

$$\tfrac{1}{2}Cl_2 + ClO_2^- \rightarrow ClO_2 + Cl^-$$

In this latter procedure, the chlorite ion formation is controlled so as to avoid further electrolytic reduction of chlorite, which inefficiently produces chlorine.

The chlorine concentration in the product off-gas stream in line 116 may be monitored and the current applied to the cell used to control the chlorine concentration in the off-gas stream.

The feeds of sodium chlorate by line 102 and of chloride ions by line 106 as well as the electrochemically-produced chloride ions establish a chlorate ion to chloride ion ratio in the cathode compartment 104 generally at least about 1:1, preferably about 2:1 to about 4:1.

The electrode potential which is applied to the cathode is more positive than $-1$ volt as compared with a saturated calomel electrode (SCE) and as determined at the current feeder to the cathode and more negative than the open circuit potential under the prevailing conditions, preferably about $-0.2$ volt.

The electrode potential of the cathode refers to the solution potential measured at the current feeder, in analogous manner to a flat plate electrode. A three-dimensional electrode, such as employed herein, inherently has a distribution of potential within the structure and the actual potential will depend on the location of determination and may be more negative than $-1$ volt vs. SCE.

The cathode compartment 104 preferably is maintained at an elevated temperature to assist in the rate of chlorine dioxide formation. Usually, a temperature in excess of about 50° C. is employed, preferably about 60° to about 80° C.

The chlorine dioxide produced in the chemical reaction, substantially free from chlorine, is vented along with steam produced in the cathode compartment 104, from the cathode compartment 104 as the product gas stream by line 116.

The aqueous generator effluent containing by-product sodium chloride from the chemical production of chlorine dioxide is removed from the cathode compartment 104 as an aqueous solution by line 118. This aqueous generator effluent is forwarded to the central compartment 22 of a three-compartment electrolytic cell 24 constructed and operated as described above with respect to the three-compartment electrolytic cell 24 in FIG. 1 and the same reference numbers are employed to identify the same parts.

The cathode employed in the cathode compartment 104 is a high surface area electrode having a three-dimensional electrolyte-contacting surface, which permits a long contact time between the reactants.

The term "high surface area" in relation to the cathode refers to an electrode of the type wherein the electrolyte is exposed to a large surface area of electrode surface in comparison to the physical dimensions of the electrode. The electrode is formed with interstices through which the electrolyte flows, and so has a three-dimensional surface of contact with the electrolyte.

The high surface area cathode may be the so-called "flow through" type, wherein the electrode is formed of electroconductive porous material, for example, layers of electroconductive cloth and the electrolyte flows through the porous structure generally parallel to the current flow while being subjected to electrolysis, and thereby is exposed to the high surface area of the mesh of the electrode.

The high surface area cathode also may be the so-called "flow by" type, wherein the electrode comprises a packed bed of individual electroconductive particles and the electrolyte flows through the packed bed generally perpendicular to the current flow while being subjected to electrolysis, and thereby is exposed to the high surface area of the electroconductive particles in the packed bed.

The electrode may be constructed of materials having a low overpotential or preferably high overpotential, particularly graphite, for the reaction $Cl_2 \rightarrow Cl^-$. As is well known to those skilled in the electrochemical art, the overpotential of an electrode towards the electrochemical reaction $Cl_2/Cl^-$ refers to the relationship of the potential applied to the electrode to the equilibrium potential to sustain the electrochemical reaction at a reasonable rate. If the electrode potential is close to the equilibrium potential, then the electrode is considered to have a "low" overpotential while, if a much more negative potential is required to achieve a significant reduction rate, then the electrode is considered to have a "high" overpotential.

Materials of construction of such low overpotential electrodes are known and are employed in the so-called "Dimensionally Stable Electrodes". Such electrodes generally comprise a substrate, which is titanium, zirconium, tantalum or hafnium, having an electroconductive coating thereon, which may be a precious metal, for example, platinum; a precious metal alloy, for example, a platinum-iridium alloy; a metal oxide, for example, ruthenium oxide or titanium dioxide; a platinate, for example, lithium platinate or calcium platinate; or mixtures of two or more of such materials. Any of these materials may be employed to provide the material of construction of a low overpotential cathode.

In the central compartment 22, the sodium chloride-rich effluent from the cathode compartment 108 in line 118 is converted into a hydrochloric acid-rich solution in line 106 for feed as acidified generator liquor to the anode compartment 104 to provide approximately one-half of the acid requirement for the chlorine dioxide-generating process.

The anolyte sulfuric acid solution from the anode compartment 110 of the cell 100 may be recycled by line 120 to line 34, with make-up water for the anode compartment 26 and the anode compartment 110 being provided by line 38. Although the anode compartments 110 and 36 are illustrated in FIG. 2 as having a common recycle loop, individual recycle loops may be employed.

As in the case of the FIG. 1 embodiment, sodium hydroxide solution is produced as a product stream in line 44 from the cathode compartment 28. The overall process involves reaction of sodium chlorate and water to form sodium hydroxide, chlorine dioxide and by-products oxygen and hydrogen, as follows:

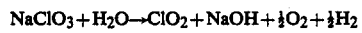

$$NaClO_3 + H_2O \rightarrow ClO_2 + NaOH + \tfrac{1}{2}O_2 + \tfrac{1}{2}H_2$$

The procedures described above with respect to FIGS. 1 and 2, therefore, are integrated operations involving a hydrochloric acid-based chlorine dioxide generating process and an electrolytic sodium hydroxide-producing process wherein by-product sodium chloride from the chlorine dioxide-generating process is processed to form half the hydrochloric acid requirement of the chlorine dioxide-generating process.

EXAMPLE

An experimental arrangement corresponding to that shown in FIG. 2 was set up. The cathode compartment of the electrolytic process for chlorine dioxide production had a length of 10 cm, a thickness of 0.6 cm and was filled with graphite particles sized 1.0 to 1.7 mm and having a nominal surface area of 0.01 m². The membrane used was a NAFION cation-exchange membrane. For the three-compartment cell, two NAFION cation exchange membranes were employed.

The procedure described above with respect to FIG. 2 was carried out to produce chlorine dioxide and sodium hydroxide. A current density of 1 KA/m² was used in the chlorine dioxide generation and a current density of 1 KA/m² was employed in the sodium hydroxide generator. Chlorine dioxide generation was effected at 70° C. while sodium hydroxide electrolysis also was effected at 70° C.

A series of experiments was carried out at different liquor flow rates and the results are reproduced in the following Table:

high chemical efficiency with some membrane losses in the three-compartment cell.

SUMMARY OF DISCLOSURE

In summary of this disclosure, the present invention provides a novel integration of chlorine dioxide generation and sodium hydroxide production, both valuable pulp mill chemicals, while at the same time decreasing the overall quantity of chlorine produced, a chemical whose pulp mill requirement is declining. Modifications are possible within the scope of this invention.

What I claim is:

1. A method for the production of chlorine dioxide and sodium hydroxide, which comprises:

reacting sodium chlorate with hydrochloric acid in a reaction zone to form chlorine dioxide and an aqueous effluent containing sodium chloride, recovering chlorine dioxide from said reaction zone, passing said aqueous effluent to the central compartment of a three-compartment electrolytic cell divided into an anode compartment, said central compartment and a cathode compartment by two cation-exchange membranes located between the anode and cathode of said cell, electrolytically forming hydrogen ions from an electrolyte in said anode compartment of said three-compartment electrolytic cell and transferring said electrolytically-formed hydrogen ions from said anode compartment to said central compartment of said three-compartment electrolytic cell across one of said cation-exchange membranes to form hydrochloric acid therein, electrolytically forming hydroxyl ions from an electrolyte in said cathode compartment of said three-compartment electrolytic cell and transferring sodium ions from said central compartment to said cathode compartment across the other of said cation-exchange membranes to form sodium hydroxide therein, forwarding effluent from said central compartment to said reaction zone to provide part of the hydrogen chloride required for said reaction with sodium chlorate, and recovering sodium hydroxide solution from said cathode compartment.

2. The method of claim 1 wherein said reaction of sodium chlorate and hydrochloric acid is effected in an

TABLE

MODIFIED R5-PROCESS, C.D. = 1 KA/m²
PROCESSES EFFICIENCIES VS. LIQUOR FLOW RATE

| LIQUOR FLOW (L/min) | u¹ (cm/s) | LIQUOR BALANCE (%) | H₂SO₄ BALANCE (%) | NaOH BALANCE (%) | NaOH MEMBRANE EFFI. (%) | CHEMICAL EFFICIENCY (%) | CURRENT EFFICIENCY (%) | ClO₂ PURITY G.A.R. (%) | ClO₃⁻ TRANSFER² (%) ACID | ClO₃⁻ TRANSFER² (%) BASE |
|---|---|---|---|---|---|---|---|---|---|---|
| 0.50 | 1.39 | — | — | — | — | — | — | 79.0 ± 0.8 | — | — |
| 0.50 | 1.39 | 102.0 | 98.9 | 93.3 | 80.6 | 102.8 | 57.1 | 79.9 ± 0.9 | 17.4 | 4.8 |
| 0.50 | 1.39 | 99.9 | — | 93.1 | 79.8 | 79.7 | 57.3 | 81 ± 1 | 17.4 | 4.5 |
| 0.80 | 2.22 | 102.1 | 98.7 | 71.5 | — | — | 69.6 | 84 ± 1 | 15.3 | 4.0 |
| 0.80 | 2.22 | 100.5 | 100.5 | 93.0 | 79.6 | 85.2 | 67.8 | 84.1 ± 0.9 | 16.1 | 4.3 |
| 1.00 | 2.78 | 101.7 | 96.5 | 94.5 | 84.5 | 96.3 | 81.8 | 84.9 ± 0.6 | 15.1 | 5.1 |
| 1.00 | 2.78 | 100.1 | 97.6 | 94.9 | 85.6 | 88.9 | 81.2 | 84.3 ± 0.6 | 13.6 | 4.0 |
| 1.00 | 2.78 | 99.9 | 97.0 | 94.4 | 84.2 | 87.8 | 82.8 | 85.0 ± 0.9 | 13.1 | 3.6 |
| 1.25 | 3.47 | 99.7 | 97.8 | 90.5 | 72.3 | 80.8 | 81.0 | 87.5 ± 0.7 | 14.3 | 4.0 |
| 1.25 | 3.47 | 101.6 | 98.0 | 93.8 | 81.8 | 90.1 | 78.8 | 87.6 ± 0.7 | 14.9 | 4.2 |
| 1.48 | 4.11 | 101.1 | 96.5 | 93.4 | 80.6 | 95.2 | 86.7 | 89 ± 1 | 13.3 | 3.6 |

¹Bed, 1.0–1.7 mm graphite particles, thickness = 0.6 cm, L = 10 cm, A = 0.01 m²
²Normalized to actual ClO₂ production As can be seen from the above data, chlorine dioxide of greater than about 80% purity can be achieved at aqueous acid reaction medium maintained at its boiling point in a reaction zone while a subatmospheric pressure is applied thereto, said chlorine dioxide is recovered from said reaction zone in gaseous admixture with chlorine and steam, and said effluent from said central compartment of said three-compartment electrolytic cell provides up to half the hydrochloric acid requirement of said reaction with sodium chlorate and the remainder of the hydrochloric acid requirement is fed from external of the reaction zone.

3. The method of claim 1 wherein said reaction of sodium chlorate and hydrochloric acid is effected in the cathode compartment of a two-compartment electrolytic cell having a cathode compartment with a three-dimensional high surface-area cathode therein and an anode compartment separated from the cathode compartment by a cation-exchange resin by:

feeding chlorate ions to said cathode compartment of said two-compartment electrolytic cell and providing hydrogen ions and chloride ions in said cathode compartment of said two-compartment electrolytic cell, reducing said chlorate ions with said hydrogen ions and chloride ions in said cathode compartment of said two-compartment electrolytic cell to form chlorine dioxide while an electric current is applied to said cathode compartment of said two-compartment electrolytic cell to reduce chlorine coproduced with said chlorine dioxide to chloride ions, and electrolytically forming hydrogen ions in said anode compartment of said two-compartment electrolytic cell and transferring said hydrogen ions across an anion-exchange membrane from said anode compartment of said two-compartment electrolytic cell to said cathode compartment of said two-compartment electrolytic cell, said chlorine dioxide is recovered from said cathode compartment of said two-compartment electrolytic cell substantially uncontaminated with chlorine, and said effluent from said central compartment of said three-compartment electrolytic cell provides up to half the hydrochloric acid requirement of said reaction with sodium chlorate and the remainder of the hydrochloric acid is produced in situ in said cathode compartment of said two-compartment electrolytic cell.

* * * * *